June 13, 1967  D. J. BOON ET AL  3,325,573
MANUFACTURE OF FOAM MATERIAL
Filed April 7, 1964  2 Sheets-Sheet 1
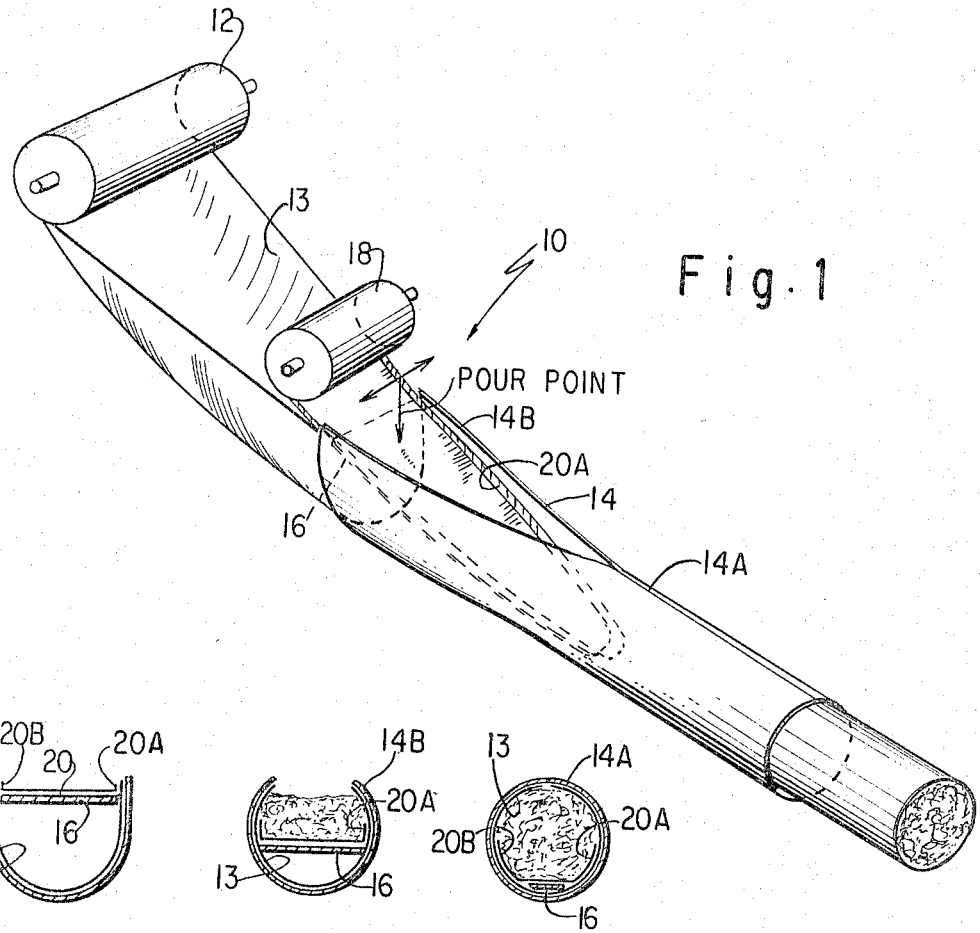
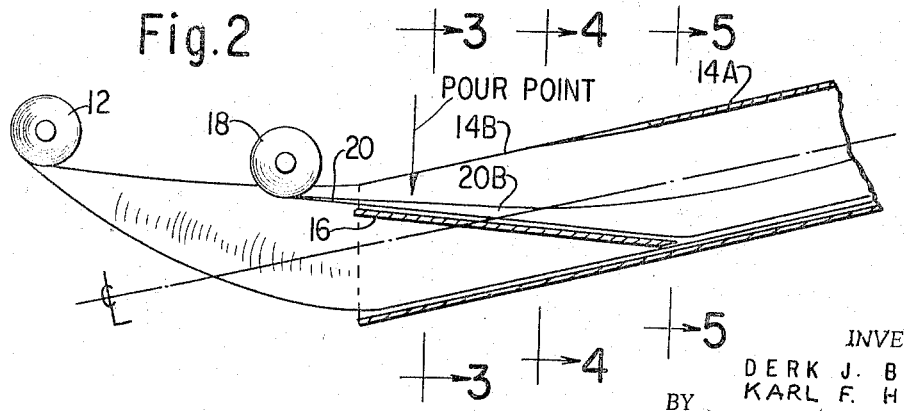
INVENTORS
DERK J. BOON
KARL F. HAGER
BY Robertson, Smythe & Bryan
ATTORNEYS

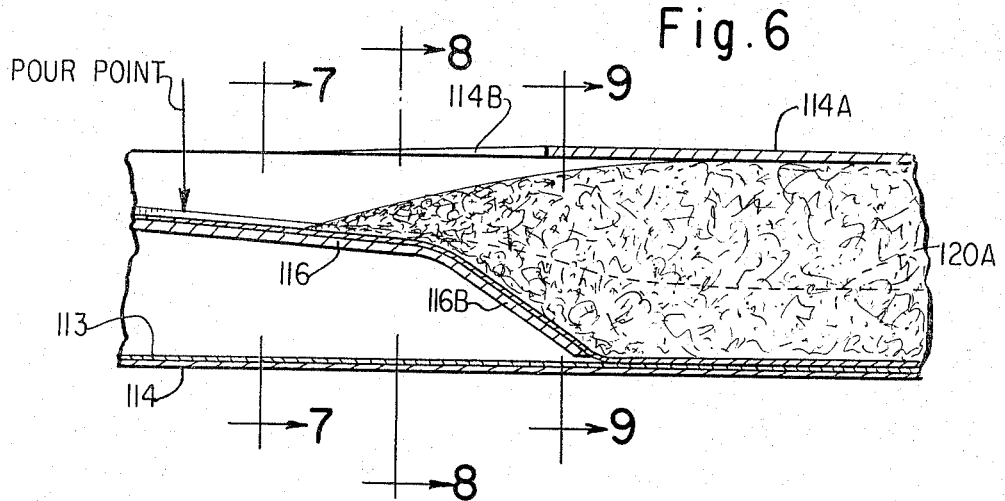
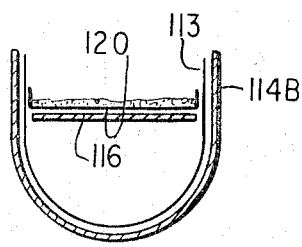
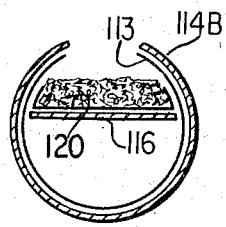
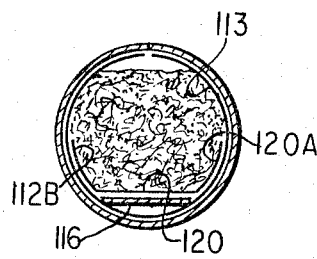

United States Patent Office 3,325,573
Patented June 13, 1967

3,325,573
MANUFACTURE OF FOAM MATERIAL
Derk J. Boon, Charlotte, and Karl F. Hager, Mooresville, N.C., assignors to Reeves Brothers, Inc., New York, N.Y., a corporation of New York
Filed Apr. 7, 1964, Ser. No. 357,957
11 Claims. (Cl. 264—54)

ABSTRACT OF THE DISCLOSURE

The specification describes a method and apparatus for making cylindrical logs of polyurethane foam in which there are illustrated two different embodiments as shown in FIGURE 1 and FIGURE 6 of the drawings. The central feature of the process and apparatus is the use of a flat pouring surface onto which the products of reaction are initially poured and from the sides of which the rising foam is simultaneously formed into arcs of the desired cylinder as the width of the flat bottom is reduced.

---

This invention relates in general to a method and apparatus for the manufacture of a foamed material; more particularly, it relates to an improved method for manufacturing free rising polyurethane foam and the apparatus therefor to obtain a molded cylinder of such foam.

One of the more important uses of flexible polyurethane foam has been to laminate thin sheets of it to a web of textile material by a permanent bonding method such as that shown in the patents to Dickey, Nos. 2,957,792 and Re. 25,493, or by any of the well known adhesive methods. Such thin sheets are cut from urethane foam blocks that have been made by continuous casting where there is formed a slab having a generally rectangular cross section. Such slabs may have a length in excess of sixty (60) feet and in order to obtain thin sheets for the aforesaid textile lamination, these slabs either have to be cut longitudinally by specially designed slicing machines or the blocks cut up into square cross sections of a normal textile width and then mounted on a machine which peels them in much the same manner as logs are peeled to make plywood.

In both of these systems for making the long thin sheets of foam, there are obvious drawbacks. The long thin material made from sliced slabs will have to be joined in a butt at the end of the length of the slab, thus causing a defect in the laminated material. This type of defect is particularly serious in laminates for clothing.

This type of defect in laminated material has been reduced by the use of a peeled foam but heretofore, such peeled foam was more expensive than sliced foam for the reason that the corners of the rectangular sectioned slab must be lost in the peeling operation.

Accordingly, it is most desirable to have polyurethane cast in a cylindrical form so that the cylinders may be readily peeled with a minimum of urethane loss.

Various attempts have been made to obtain or approach a round cross section. In one attempt, the foam was cast in a rectangular open top mold and allowed to rise freely so as to obtain a high crest in much the same manner as occurs in a loaf of bread. This, of course, is only an approach to half of the problem because the lower portion of the molded bun of foam must have its corners removed and lost.

Other attempts have been made in which foam is poured into a vertically arranged cylindrical mold but there is insufficient rise in any of the usual formulations to yield an acceptable cylinder of any useful length.

Others have attempted to pour the foaming reaction liquids into a hemicylindrical open top mold. However, the pile-up of reaction liquid in the center portion thereof results in too high a rise in the center with the attendant cracking of the surface of the foam.

The present invention provides a method of molding a cylinder of free rising polyurethane foam in which the reaction products are poured into a flat bottomed mold of a width approximately equal to the desired diameter of the cylinder and progressively decreasing the width of the bottom of the mold to zero while simultaneously forming the sides of the rising foam into a cylinder during a period which is less than the time period of its rise.

Additionally, the invention provides that the above method be carried out while the foam is being continuously molded in a laterally moving path.

Further, the invention contemplates cylindrically forming the rising foam by dropping the flat bottom of the rising foam within the cylinder of the size finally desired and in which the dropping of the foam occurs within the first three-fourths (¾) and preferably in the first two-thirds (⅔) of the time period of foam rise.

The invention also provides a mold for continuously molding free rising polyurethane into a cylindrical form during the time period of its rise in which there is a laterally extended and downwardly declined translatable mold that gradually changes from a flat bottomed form to that of a generally closed cylinder in a distance which is less than that traversed by the rising foam during its translation in the time period.

The invention further provides that the flat bottomed portion extends downwardly from a position of that of the horizontal diameter of the cylinder.

The aforesaid cylindrical mold may be also arranged so that the flat bottom portion has a constant angle of decline.

A further feature of the mold apparatus is to provide a flat bottom portion of the aforesaid mold where there is an initial portion having only a slight downward incline and at the opposite end thereof a much greater incline.

Other advantages, objects and features obtained by use of the invention will be apparent from the following description and drawings which are merely exemplary.

In the drawings:

FIG. 1 is a perspective view of one form of apparatus embodying the invention;

FIG. 2 is a vertical section of the apparatus of FIG. 1;

FIG. 3 is a transverse section taken along lines 3—3 of FIG. 2;

FIG. 4 is a vertical transverse section taken along lines 4—4 of FIG. 2;

FIG. 5 is a vertical transverse section taken along the lines 5—5 of FIG. 2;

FIG. 6 is a semischematic of a longitudinal section of an alternate embodiment of apparatus embodying the present invention;

FIG. 7 is a vertical transverse section taken along lines 7—7 of FIG. 6;

FIG. 8 is a vertical transverse section taken along lines 8—8 in FIG. 6; and

FIG. 9 is a vertical transverse section taken along lines 9—9 of FIG. 6.

The invention herein is based on the discovery that one may gradually take a flat molding sheet of foaming reaction products and shape it into a cylindrical form as these products rise, by imparting some vertical upward motion to the outer edges of the molding sheet during a period which is less than the time of completion of the foam rise. In order to do this, one must gradually change the outer flat bottomed edges of the foam to portions of the arc of the cylinder and thereby gradually decrease to zero the width of the flat bottom portion of the mold. If the cylindrical forming of the rising foam is completed during the rise period of the foam, then the circumference thereof is formed in the same time period. As the method envisions forming the circumference from two sides simultaneously, the sides can be said to be formed at the rate of $\pi/2$ times the rate of rise of the foam. While, with respect to the gradual decreasing of the width of the flat bottom, the rate of change is greater than $\pi/2$ times the rate of rise as will be apparent with reference to the description of the illustrations.

This principle can probably best be illustrated with refernce to FIG. 1 in which there is shown a molding apparatus of the type which continuously molds the reaction products in a laterally extending mold section. The mold 10 is formed from a roll 12 of forming material such as kraft paper 13, which is withdrawn laterally from the roll 12 and passed through a cylindrical shaping section 14 which is inclined, here for example at 8 degrees. The after portion 14A has the desired cylindrical configuration while the entrance portion 14B has been sliced along the center line of the top of the mold former and flared outwardly so that the one end is a hemicylinder with upstanding sides (see FIG. 3). When the kraft paper 13 is drawn through the shaping section 14, a cylinder of the size intended is naturally formed.

With reference to FIGS. 1 through 5, there is disposed within the kraft paper 13 shortly after it leaves the roll 12 a flat pouring surface 16 which closely fits within the mold and which lies in a truncating plane for said cylinder. At the point where the pouring surface is placed, the molding kraft paper 13 has a hemicylindrical U-shape of a width which is also the approximate diameter that is intended for the ultimate cylinder as shown in FIG. 3. Further, the flat pouring surface 16 extends from a position approximating that of the horizontal diameter of the cylinder and is declined at a constant angle of 12½ degrees from the horizontal. The surface terminates at the position where the molding kraft paper 13 has just closed to form the cylinder. The length of the pouring surface 16 running from the pour point as indicated in FIGS. 1 and 3 is for this specific example about one-third of the distance that the translating form travels during the time period of foam rising as will be described more completely hereinafter.

Disposed within the enveloping kraft paper 13 is a roll 18 of auxiliary molding material 20 which is laterally removed from the roll and caused to spread along the top of the pour surface 16 at the same rate of motion as the kraft paper 13. Further, the auxiliary molding material 20 initially has a small lip formed by the upturned edges 20A, 20B which contact the upstanding sides of the hemicylindrical portion of the mold paper 13. These lips or edges contain the liquid reaction products during their initial rise.

The preferable material for the auxiliary molding material in this embodiment is a thin sheet of flexible plastic such as polyethylene, but where less flexibility is needed, kraft paper may be used.

Adjacent the roll 18 of auxiliary molding material 20, there is semischematically indicated a pour point which represents the position of the well known mixing nozzle (not shown) that is translated laterally across the mold in the known manner to deposit the chemical reaction products that ultimately form the foam.

An alternate form of molding apparatus which utilizes the principle of the invention is shown in FIGS. 6, 7, 8 and 9 in which a one hundred series of numbers are used to designate parts which perform the same function as those previously described.

In these illustrations, the molding paper feed rolls have been omitted to simplify the showing of the essential features of the apparatus. Accordingly, molding paper 113 is caused to be formed in a hemicylindrical shape and then into a cylindrical shape by the shaping section 114 as was previously described with reference to FIGS. 1 to 5. The desired cylindrical configuration 114A and the hemicylindrical portion 114B doing the work of gradually shaping the molding paper 113 as it is caused to be laterally moved therethrough by conventional equipment (not shown).

Within paper 113, the flat bottomed pouring surface 116 closely fits the mold and begins its decline from a position at, but slightly above, the horizontal center line of the cylinder. The surface has an initial portion 116A which lies in a slightly declined truncating plane at an angle of 5 degrees from the horizontal. An after drop portion 116B has a greater decline of 25 degrees and the surface ends at a position where the shaping section 114 closes to a cylinder form. In this embodiment, the flat bottom surface gradually decreases the width of the bottom and then rapidly reduces the bottom width to zero due to the steep decline of the drop portion 116B.

As in the apparatus of FIGS. 1 to 3, an auxiliary molding material 120 with upstanding lips or edges 120A, 120B is caused to spread over the flat bottom surface 116 and be laterally moved at the same speed as the mold paper 113. The lips 120A, 120B while containing the liquid reacting products slide along in contact with and being supported by the upstanding side of the mold paper 113.

The pour point indicated in FIG. 6 is the position where the liquid reacting products are deposited on the laterally moving mold. Shortly after the foam begins to rise, as shown in FIG. 8, the foam is passed onto the drop portion 116B where it is caused to quickly drop against the hemicylindrical mold 113. During this portion of lateral travel, the mold shaping section has become closed and the foam has risen much more as it is turned inwardly by the walls of the enveloping mold 113. Thus, the end of the flat surface 116 is left by the foam prior to its having completed its time period of foam rise but nevertheless, at that point, the foam generally fills the cylindrical cross section of the mold as shown by FIG. 9. Generally, the drop 116B should occur within the second quarter of the time period of foam rise.

Experience has also shown that cylindrical foam logs can be made in a laterally translating cylindrical mold with a flat bottomed pouring surface in a downwardly truncating plane. The fact that the upper walls of the mold are already formed into arcs of the cylinder does not appear to be a critical factor.

The time period of foam rise is computed from the moment that it leaves the mixing nozzle at the pour point until it stops rising. For each known formulation, there is a characteristic rise time period and for laterally moving molds, there is an optimum speed of translation of the foam so that the length from the pour point to the position of completion of time period of foam rise is a known or easily determined distance.

The invention as disclosed herein is applicable to all of the free rising urethanes whether they be of the polyester or polyether type, rigid or flexible.

A specific example of the foam molding that may be made according to the invention is as follows:

A flexible polyester foam is prepared by substantially, uniformly, and continuously mixing together about 100 parts by weight of a polyester prepared from 10 mols. of adipic acid, 16 mols. of diethylene glycol and 1 part of trimethyl propane, having an OH number of approximately 56 and an acid number of about 1; about 46 parts by weight of a mixture of 80% 2,4-tolylene diisocyanate and about 20% 2,6-tolylene dissocyanate; about 3.71 parts of water; about 0.75 part of methyl ammonium oleate; about 1.7 parts of sulphonated castor oil; about .5 part of Armeen DM16D, a tertiary amine of the general formula

where $R_1$ is methyl and $R_2$ is a 16 carbon alkyl group (made by Armour Chemical Company); 0.6 part by weight of N-coco-morpholine, 2.0 parts by weight of N-ethyl-morpholine. The reaction mixture, prepared as described above, is poured at a rate of 44 lbs./minute onto the flat pouring surface 16, 116 which is covered with the auxiliary mold paper or plastic film 20, 120 which is moving laterally at a speed of approximately 12 ft./minute.

The flat bottom pouring surface is declined in the direction of removal of the foaming reaction liquid. The reaction mixture, prepared as described above, will start expanding after approximately 4 seconds after mixing and this expansion will continue until approximately 55 seconds after mixing, resulting in a foam of approximately 1.65 lbs./cu. ft. density. Thus, the foam rise length for the rise period is about 11 feet.

The expanding reaction mixture moved away by the mold paper or plastic film 20, 120, over the flat bottomed pouring surface is transferred into a cylinder shape mold of 20-inch diameter. This transfer takes place as the foam crosses the truncating line of contact between the flat pouring surface and cylinder shape mold, and is completed at a distance of 8 feet from the pour point or about three-fourths (¾) of the rise period and length.

The cylindrical portion of the mold is slightly inclined so that the end of the flat pouring surface will intersect with the bottom of the mold.

The angles of decline and incline of the pouring surface 16 and the cylindrical mold 14 respectively, vary, depending on the formulation of foam, final diameter, speed of conveyor and rate of discharge of the liquid reaction products. The important factors being that the pouring surface 16 have some decline and that it truncate the cylindrical mold. It is believed that pour surface declines may usefully be in the range of 2 to 15 degrees and the mold is best situated at zero degrees incline but it can be inclined in the range of 0 to 10 degrees.

The decline angle of the pour surface is limited by the device to prevent cascading of the rising foam but those in the art will recognize that such angle is related to the diameter of the intended cylinder and a good throughput.

Most importantly, it has been found that the final transfer from the end of the flat pouring surface to the cylindrical mold must not occur later than the end of the first three-fourth (¾) of the rise time if serious bottom voiding is to be avoided. Preferably, the final transfer from the pouring surface to the cylindrical mold should occur prior to the end of the first two-thirds (⅔) of the rise time of the foam. Good results have been obtained when such transfer is completed prior to the end of the first one-half (½) of the rise time.

Although the various features of the invention have been shown as applied to several embodiments of the invention, it will be evident that changes may be made in such details and certain features may be used without others without departing from the principles of the invention.

As used herein, the phrase "generally closed cylinder" is intended to define a completely closed cylindrical mold and others which are not quite closed but which to all practical effects yield a cylindrical form. Further, the method disclosed can be used to form non-circular but curvilinear shapes.

What is claimed is:

1. In the foaming of free rising polyurethane, the method of molding a cylinder thereof comprising pouring reaction products into a flat bottomed mold of a width approximately equal the desired diameter of said cylinder, progressively decreasing the width of the bottom to zero and simultaneously forming the sides of the body of rising foam into arcs of the desired cylinder and then into the final cylinder during a period which is less than the time period of rise and completing the rise of said foam within said final cylinder during the remainder of said time period.

2. A method according to claim 1 in which the foam is being continuously molded in a laterally moving path.

3. A method according to claim 2 in which the portion of said body of rising foam above said flat bottomed mold is formed by dropping said portion of said body into a cylindrical mold of the size finally desired for said final cylinder, said dropping occurring within at least the first three-fourths (¾) of said time period of foam rise.

4. A method according to claim 2 in which the portion of said body of rising foam above said flat bottomed mold is formed by dropping said portion of said body into a cylindrical mold of the size finally desired for said final cylinder, said dropping occurring within at least the first two-thirds (⅔) of said time period of foam rise.

5. A mold for the continuous foaming of free rising polyurethane into a cylindrical form which is arranged to contain the liquid reaction products during the time period of their reaction and free rise to solidified foam comprising a laterally extending and downwardly declined translatable mold that gradually changes from a flat-bottomed form to a generally closed cylinder in a distance which is less than that traversed by the rising foam during said time period.

6. A mold for the continuous foaming of free rising polyurethane into a cylindrical form which is arranged to contain the liquid reaction products during the time period of their reaction and free rise to solidified foam comprising a laterally extending and downwardly declined translatable mold that gradually changes from a flat-bottomed form to a generally closed cylinder in a distance which is less than that traversed by the rising foam during said time period, said flat-bottomed form extending downwardly from a position of approximately that of the horizontal diameter of said cylinder.

7. A mold according to claim 5 in which the flat-bottomed form of said mold has a constant angle of decline.

8. A mold according to claim 5 in which the flat-bottomed form of said mold has an initial portion at a slight downward decline and the remainder portion has a greater decline.

9. A mold for the continuous foaming of free rising polyurethane which is arranged to contain the liquid reaction products during the time period of their reaction and free rise to solidified foam comprising a laterally extending translatable generally cylindrical mold, and a flat pouring surface closely fitting within said mold as a declining truncating surface relative to the centerline of said generally cylindrical mold, the length of said pouring surface being less than that which the translating foam travels in said time period of foam rise.

10. A mold for the continuous foaming of free rising polyurethane which is arranged to contain the liquid reaction products during the time period of their reaction and free rise to solidified foam comprising a laterally extending translatable generally cylindrical mold, a flat pouring surface closely fitting within said mold as a declining truncating surface relative to the centerline of said generally cylindrical mold, the length of said pouring surface being less than that which the translating foam travels in said time period of foam rise, and a continuously translating auxiliary flexible mold material sliding over the flat-bottomed portion of said mold and having turned up edges that slidingly contact the walls of said mold to provide a U-shaped container for the reacting products during the initial portion of said time period of rise.

11. A mold for the continuous foaming of free rising polyurethane which is arranged to contain the liquid reaction products during the time period of their reaction and free rise to solidified foam comprising a slightly upwardly inclined laterally translatable generally cylindrical mold and a flat pouring surface closely fitting within said mold as a slightly declining truncating surface, the length of said pouring surface being less than that which the translating mold travels in said time period of foam rise, and a continuously translating auxiliary flexible mold material sliding over said pouring surface and having turned up edges that slidingly contact the walls of said mold to provide a U-shaped container for the reacting products.

References Cited
UNITED STATES PATENTS

| | | | |
|---|---|---|---|
| 2,898,626 | 8/1959 | Alderfer et al. | 264—47 XR |
| 2,957,207 | 10/1960 | Roop et al. | 264—54 |
| 3,249,486 | 3/1966 | Voisinet et al. | 264—54 XR |

FOREIGN PATENTS

| | | |
|---|---|---|
| 161,277 | 2/1955 | Australia. |

ALEXANDER H. BRODMERKEL, *Primary Examiner.*

P. E. ANDERSON, *Assistant Examiner.*